US008935048B2

(12) United States Patent
Sun

(10) Patent No.: US 8,935,048 B2
(45) Date of Patent: Jan. 13, 2015

(54) MULTI-FUNCTION VEHICLE-ROLLOVER JUDGMENT SYSTEM AND AUTOMATIC ANTI-ROLLOVER DEVICE

(76) Inventor: Yuliang Sun, Botou (CN)

(*) Notice: Subject to any disclaimer, the term of this patent is extended or adjusted under 35 U.S.C. 154(b) by 0 days.

(21) Appl. No.: 14/007,222

(22) PCT Filed: Mar. 20, 2012

(86) PCT No.: PCT/CN2012/072622
§ 371 (c)(1),
(2), (4) Date: Oct. 30, 2013

(87) PCT Pub. No.: WO2012/126353
PCT Pub. Date: Sep. 27, 2012

(65) Prior Publication Data
US 2014/0058625 A1 Feb. 27, 2014

(30) Foreign Application Priority Data
Mar. 24, 2011 (CN) .......................... 2011 1 0072592
Mar. 24, 2011 (CN) .......................... 2011 2 0080979

(51) Int. Cl.
B60G 17/016 (2006.01)
B60G 23/00 (2006.01)
B62C 3/00 (2006.01)
B62K 25/00 (2006.01)
(Continued)

(52) U.S. Cl.
CPC .......... *B60G 21/005* (2013.01); B60W 2520/10 (2013.01); B60W 2520/18 (2013.01); *B60R 21/0132* (2013.01); *B60W 10/184* (2013.01); B60R 2021/01252 (2013.01); B60G 2800/9124 (2013.01); B60W 2050/143 (2013.01); *B60G 17/0162* (2013.01); B60W 2710/182 (2013.01);
*B60T 8/243* (2013.01); *B60W 10/22* (2013.01); B60G 2400/25 (2013.01); *B60W 30/04* (2013.01); B60W 2540/18 (2013.01); *B60R 16/0233* (2013.01)
USPC .......................................................... 701/38

(58) Field of Classification Search
CPC ............ B60G 17/0162; B60G 21/005; B60R 16/0233; B60R 21/0132; B60W 30/04; B60W 10/184; B60W 10/22; B60T 8/243
USPC .......................................................... 701/38
See application file for complete search history.

(56) References Cited

FOREIGN PATENT DOCUMENTS

| CN | 2333597 | 8/1999 |
|----|---------|--------|
| CN | 1390727 | 1/2003 |

(Continued)

Primary Examiner — Maceeh Anwari
(74) Attorney, Agent, or Firm — Hamre, Schumann, Mueller & Larson, P.C.

(57) ABSTRACT

This invention public a multi-functional rollover judgment system and automatic anti-rollover device which are all belong to vehicle area. The mentioned system at least includes two displacement sensors and ECU which is connected with mentioned sensors correspondingly, and the output device (connected with ECU). The mentioned displacement sensor is distributed by a group of two, and at least one group mentioned displacement sensor is set between the frame and axle symmetrically. The mentioned device includes multi-functional judgment system and its connected actuator, and the mentioned actuator at least includes left actuator and right actuator which are symmetrically set on the frame. Both of the mentioned left actuator and right actuator include a telescopic shaft and the return wheel which is set on the outside of telescopic shaft. The invention can prevent the rollover accident from happening in any condition and have wide application range & high accuracy.

10 Claims, 6 Drawing Sheets

(51) Int. Cl.
*G06F 7/00* (2006.01)
*G06F 17/00* (2006.01)
*G06F 19/00* (2011.01)
*B60R 21/0132* (2006.01)
*B60W 10/184* (2012.01)
*B60T 8/24* (2006.01)
*B60G 21/00* (2006.01)
*B60W 10/22* (2006.01)
*B60W 30/04* (2006.01)
*B60R 16/023* (2006.01)
*B60R 21/01* (2006.01)
*B60W 50/14* (2012.01)

(56) References Cited

FOREIGN PATENT DOCUMENTS

| | | |
|---|---|---|
| CN | 1603182 | 4/2005 |
| CN | 101350137 | 1/2009 |
| CN | 201309387 | 9/2009 |
| CN | 201419690 | 3/2010 |
| CN | 102092374 | 6/2011 |
| CN | 202089015 | 12/2011 |
| DE | 10012448 | 10/2001 |

MULTI-FUNCTION VEHICLE-ROLLOVER JUDGMENT SYSTEM AND AUTOMATIC ANTI-ROLLOVER DEVICE

TECHNICAL FIELD

This present invention relates to the vehicle field, and mainly refers to a multi-function vehicle-rollover judging system and automatic anti-rollover device.

BACKGROUND

When vehicle is in motion or during transport, if the cornering speed is too rapid, or the loading is in unbalance, and other reasons may lead to vehicle rollover and can cause the loss of life and property. This accident happens frequently in our daily life.

At present, how to avoid the vehicle rollover has become a big problem (especially for large motorbuses, heavy vehicles, and engineering vehicles) in vehicle industry at home and abroad. The current automatic anti-rollover device, i.e. the publication number: CN01121520.8, and the name of invention: automatic anti-rollover device for cars. It is one kind of automatic anti-rollover devices which can detect the centrifugal acceleration in turnover with an acceleration sensor (judging the rollover tendency based on the centrifugal acceleration) However, despite the centrifugal acceleration during the turnover, there are other various reasons leading to rollover, such as the imbalanced carload, side impact force, the side-direction wind and the road inclination, etc. In addition, at the same centrifugal acceleration, the vehicle with lower barycenter position is safer but not for the vehicle with high barycenter position. In other words, centrifugal acceleration is determined by two parameters—the cornering speed and radius of turning circle, and non-related to the vehicle itself. Therefore, it is not accurate and has limited application scenarios to judge the rollover tendency only based on the centrifugal acceleration detected by the acceleration sensor.

By now, the common way to avoid the vehicle rollover is applied the brakes on the outside wheels of the vehicles. The yaw moment can counteract part of the centrifugal force during the vehicle turning, which can lower the probability of rollover. However, it is only effective for the rollover of cars with low barycenter position, and not for the heavy loades trucks or engineering vehicles with high barycenter position. Therefore, the effect is limited of avoiding the vehicle rollover by applying the brakes on the outside wheels of the vehicles.

SUMMARY

In order to overcome the problems of limited application scenarios and inaccuracy in the existing technology of judging the vehicle rollover tendency based on the centrifugal acceleration and the current anti-rollover methods. This invention's implementation provides a multifunctional vehicle rollover judgment system and automatic anti-rollover device. The following is the mentioned technical scheme:

The multifunctional vehicle rollover judgment system contains at least two displacement sensors, which are respectively connected to ECU (Electronic Control Unit, or "Trip computer", "Onboard computer"), and output device connected to the mentioned ECU. The mentioned displacement sensors are distributed to groups of two sensors, and there is at least the symmetrical setting position of one group of displacement sensors between the mentioned vehicle frame and vehicle bridge.

Specifically, the mentioned vehicle is a three-wheel transporter, and the vehicle bridge is single vehicle bridge. The number of mentioned displacement sensors is two, and respectively installed between the two sides of vehicle frame and vehicle bridge, and perpendicular to the mentioned vehicle frame and vehicle bridge.

Specifically, the mentioned vehicle has more than two vehicle bridges, and at least four, or at least two groups of displacement sensors. One group is respectively installed between the two sides of vehicle frame and front vehicle bridge, and perpendicular to the mentioned vehicle frame and front vehicle bridge. And the other group is respectively installed between the two sides of vehicle frame and end vehicle bridge, and perpendicular to the mentioned vehicle frame and end vehicle bridge.

Further, the mentioned vehicle consist of multiple front vehicle bridges or/and back vehicle bridge, and the symmetrical displacement sensor groups between the mentioned front vehicle bridge and vehicle frame, and between the back vehicle bridge and vehicle frame.

Specifically, the mentioned output device contains display module and pre-alarm module.

In further, the mentioned system is also including an input module, which is connected to the mentioned ECU.

Further, the mentioned system is connected to an actuating mechanism which is used for avoid the rollover accident.

Also, the mentioned system include a steering wheel angle sensor and a speed sensor, both are connected to the mentioned ECU.

This invention also provides an automatic anti-rollover device containing the mentioned multi-function vehicle-rollover judging system. The mentioned device include multi-functional rollover judgment system and actuator which is connected with ECU (under its control); the mentioned actuator at least include left actuator and right actuator symmetrically on the frame and the above mentioned left actuator and right actuator all include a telescopic shaft and the return wheel (on the outside of shaft); the mentioned shaft all provide power through power element, and control the mentioned telescopic shaft to implement the telescopic motion through driving element; the mentioned return wheel is dangling toward the mentioned wheel and ground, and its tread is the same with tread of mentioned vehicle.

Further, the mentioned vehicle frame respectively set the mentioned actuating mechanisms on the front and back position.

Specifically, the mentioned power element include high-pressure gasholder, solenoid valve and pipeline; the mentioned high-pressure gasholder is connected with the driving element through the mentioned solenoid valve in the pipeline, and the mentioned solenoid valve is also connected with ECU; the mentioned driving element include air cylinder which is connected with high-pressure gasholder through solenoid valve in the pipeline, and the mentioned cylinder is connected with telescopic shaft through fixed plate.

Specifically, The automatic anti-rollover device in the claim 4 or 5, its character lie in the mentioned power element include hydraulic power pack, solenoid valve and pipeline; the mentioned hydraulic power pack is connected with the driving element through solenoid valve in the pipeline, and the mentioned solenoid valve is connected with ECU; the mentioned driving element include hydraulic cylinder which is connected with the hydraulic power pack through solenoid valve in the pipeline, the mentioned is still connected with mentioned telescopic shaft through fixed plate.

Specifically, the mentioned power element include driving motor which is connected with ECU; the mentioned driving element include mesh gear and rack, the mentioned rack setting is set on the telescopic shaft and the mentioned gear is connected with the mentioned driving motor and drove by it.

This invention also provides another automatic anti-rollover device containing the mentioned multi-function vehicle-rollover judging system. The mentioned device include multifunctional rollover judgment system and actuator, and the actuator is connected with ECU 6 and controlled under it; the mentioned actuator include front-left wheel brake controlling device, front-right wheel brake controlling device, back-left wheel controlling device and back-right wheel brake controlling device; the mentioned actuator also include left actuator and right actuator which is symmetrically set on the frame. Both of the left actuator and right actuator include a telescopic shaft, and the return wheel which is set on the outside of mentioned telescopic shaft. The mentioned telescopic shaft provides power through power element and control the mentioned telescopic shaft to implement the telescopic motion through driving element; the mentioned return wheel is dangling toward mentioned wheel and ground, and its tread is the same with tread of mentioned vehicle; The front-left wheel brake controlling device, front-right wheel brake controlling device, back-left wheel controlling device and back-right wheel brake controlling device implement alternate braking toward front-left wheel, back-left wheel or front-right wheel and back-right wheel of the vehicle's outside turning under the control of ECU.

The invention technical scheme can bring the following beneficial effects:

This invention of the mentioned multi-function vehicle-rollover judging system can manually control the balance of the loading goods or launching the ECU unbalance loading alarm-module by setting loading offset (detected by displacement sensor between the vehicle frame and vehicle bridge), sending it to ECU and detect the loading capacity.

This invention also provides an automatic anti-rollover device containing the mentioned multi-function vehicle-rollover judging system and the connected actuating mechanism. The displacement sensor detect the loading offset of left and right wheel, then send the information to ECU which can judge and decide to launch the actuating mechanism in order to avoid the rollover. Whatever the reason is, all rollover are reflected to the offset of the loading wheel. This invention is based on above theory and has the advantages of wide range of application and high accuracy (compared with the current technology).

BRIEF DESCRIPTION OF THE DRAWINGS

FIG. 3b is the upward view of FIG. 3a;

FIG. 6b is the restoration graph of FIG. 6a;

In the figures: 1 front-left displacement sensor, 2 front-right displacement sensor, 3 back-left displacement sensor, 4 back-right displacement sensor, 5 display module, 6 ECU, 7 left actuating mechanism, 8 right actuating mechanism, 9 pre-alarm module, 10 vehicle frame, 11 front-left wheel, 12 front-right wheel, 13 elastic component, 14 front vehicle bridge, 15 back-left wheel, 16 back-right wheel, 17 back vehicle bridge, 21 supporting wheel, 22 telescopic shaft, 23 fixed plate, 24 air cylinder, 25 solenoid valve, 26 high pressure gasholder, 27 hydraulic cylinder, 28 rack, 29 gear, 30 hydraulic pump station, 31 vehicle speed sensor, 32 steering wheel corner sensor, 33 front-left wheel brake control device, 34 front-right wheel brake control device, 35 back-left wheel brake control device, 36 back-left wheel brake control device.

DETAILED DESCRIPTION OF THE PREFERRED EMBODIMENTS

To make more clearly about the goal, technical plan and advantages, next we will make further detailed description on the implementation methods combined with the attached figures.

Implementation 1

Figure 1:
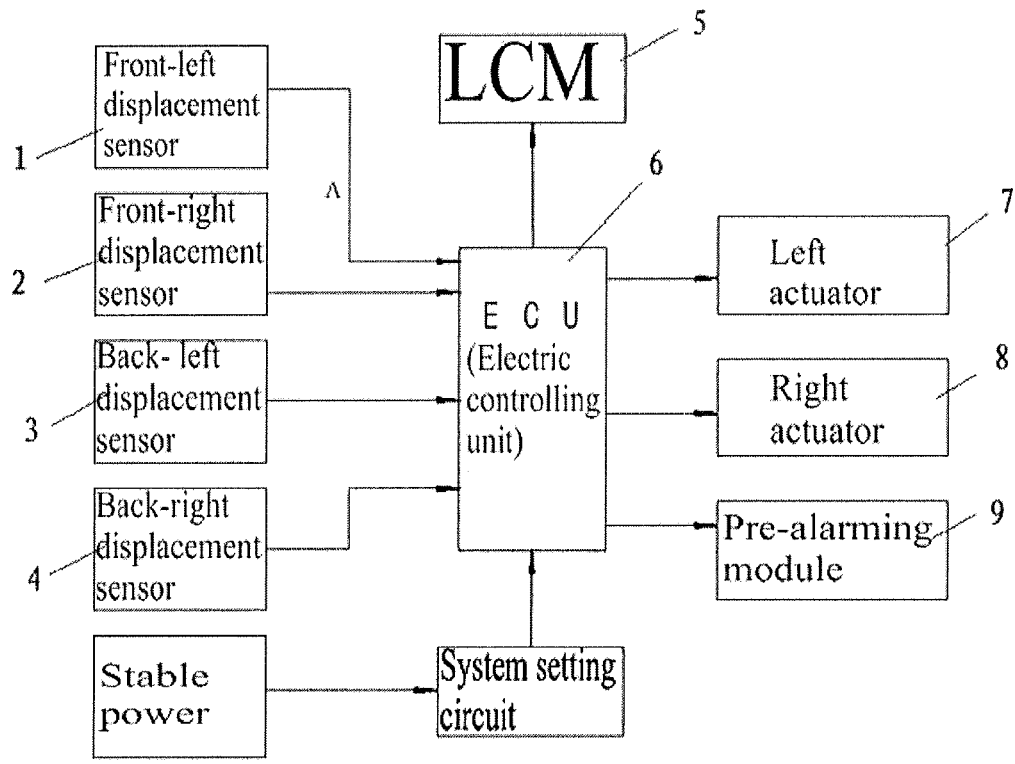
FIG. 1 is the logical control graph of the mentioned system in the invention.

As shown in FIG. 1, this implementation described a multifunctional vehicle rollover judgment system which contains at least two displacement sensors, which are respectively connected to ECU (Electronic Control Unit, or "Trip computer", "Onboard computer"), and output device connected to the mentioned ECU 6. The mentioned displacement sensors are distributed to groups of two sensors, and there is at least the symmetrical setting position of one group of displacement sensors between the mentioned vehicle frame 10 and vehicle bridge.

Here, vehicle bridge is also called vehicle axle.

Figure 2:
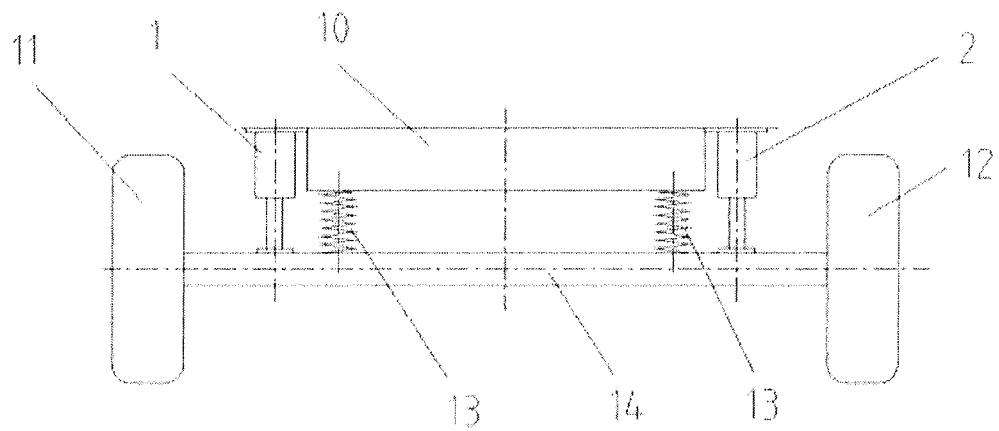
FIG. 2 is the installation graph of the mentioned system in the invention.

As shown in FIG. 2, this implementation takes a three-wheel transporter as example, and the vehicle bridge is single vehicle bridge. The number of mentioned displacement sensors is two (1, 2), and respectively installed between the two sides of vehicle frame 10 and vehicle bridge 14, and perpendicular to the mentioned vehicle frame 10 and vehicle bridge 14.

Specifically, see FIG. 2, in the implementation, we take a common four-wheeler as an example, which contains a front vehicle bridge 14 and a back vehicle bridge 17, the mentioned system see in FIG. 1, there are four displacement sensors which are divided into two groups, including the symmetrical displacement sensor group of front-left displacement sensor 1 and front-right displacement sensor 2, and group of back-left displacement sensor 3 and back-right displacement sensor 4. See FIG. 2, one group of the mentioned displacement sensor, i.e. front-left displacement sensor 1 and front-right displacement sensor 2, respectively symmetrically installed in the both sides of the mentioned vehicle frame 10 and between the mentioned front vehicle bridge 14, and perpendicular to front vehicle bridge 14 and vehicle frame 10. See in FIG. 1, the other group of the mentioned displacement sensor, i.e. back-left displacement sensor 3 and back-right displacement sensor 4, respectively symmetrically installed in the both sides of the mentioned vehicle frame 10 (See in FIG. 2) and between the mentioned end vehicle bridge 17, and perpendicular to end vehicle bridge 17 and vehicle frame 10 (See in FIG. 2).

Both sides of all displacement sensors are respectively fixed in the outside of vehicle frame 10 and vehicle bridges. All the outputs of displacement sensors are respectively connected into the input end of ECU 6. All displacement sensors are used to detect the vertical displacement amount between the outside of vehicle frame 10 and vehicle bridges. This is also amount X of elastic deformation of elastic component 13 of suspension system corresponding to the vehicle frame 10. This deformation is transmitted to the ECU 6 by wire, the ECU 6 through the CPU (Central Processing Unit) processing transform to calculate the corresponding displacement sensor carrying capacity of the one wheel. ECU 6 to the frame by means of the displacement sensor 10 between the outside and the axle calculated from the amount of vertical displacement relative to the axle frame displacement speed, the displacement speed is the turning speed of the frame.

Referring to FIG. 2, the load capacity is calculated as follows, according to Hooke's law, to calculate the left side of the vehicle relative to the vehicle frame 10 between the front axle force of the elastic member 13, i.e. F L=KX left. Where, F is the force of the elastic member 13, K is the coefficient of stiffness of the elastic element 13, X is the amount of deformation of the elastic element 13, F is equal to the vehicle frame 10 left of the elastic pressure member 13, the pressure is the same as the vehicle front 14 on the left wheel axle bearing weight. Pursuant to calculate the vehicle front axle 14 right wheels, the vehicle left and right rear wheel axle 17 of bearing weight.

Further, if the mentioned vehicle contains more than four wheels and multiple front and back vehicle bridges, based on the needs, the mentioned displacement sensors can also be respectively set between the mentioned front vehicle bridges and the mentioned vehicle frame, and between the back vehicle bridges and the mentioned vehicle frame.

In this example, see FIG. 1, the mentioned output device contains a display module 5 and the pre-alarm module 9.

Further, referring to FIG. 1, the mentioned system also contains an input module (not shown in the figure), the input module is connected with the ECU 6, which facilitate the input for system.

Further, the system is also connected to an actuating mechanism for preventing the mentioned vehicle rollover. Wherein the actuating mechanism can be any of the existing anti-rollover technology, and the actuating mechanism can match the mentioned multi-function vehicle-rollover judging system.

Thus, based on the function expansion of the system of the present invention ECU 6, making the system also has such functions: automatic vehicle anti-rollover, rollover vehicle speed detection, vehicle load measurement, and load cargo partial load indication and alarm functions.

Implementation 2

Figure 3A:
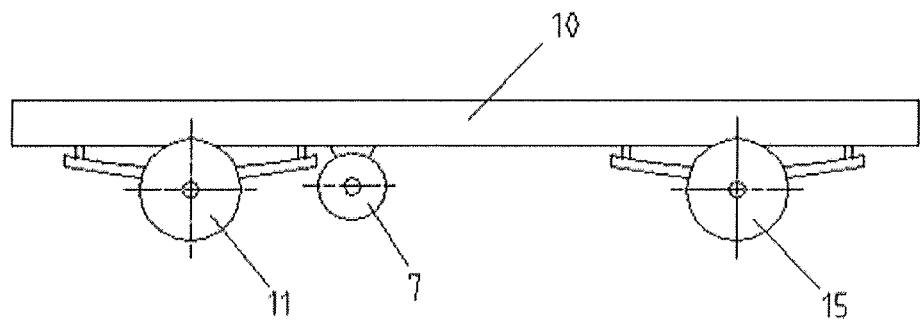
FIG. 3a is the main view of the mentioned actuating mechanism in the mentioned device of the invention.
Figure 3B:
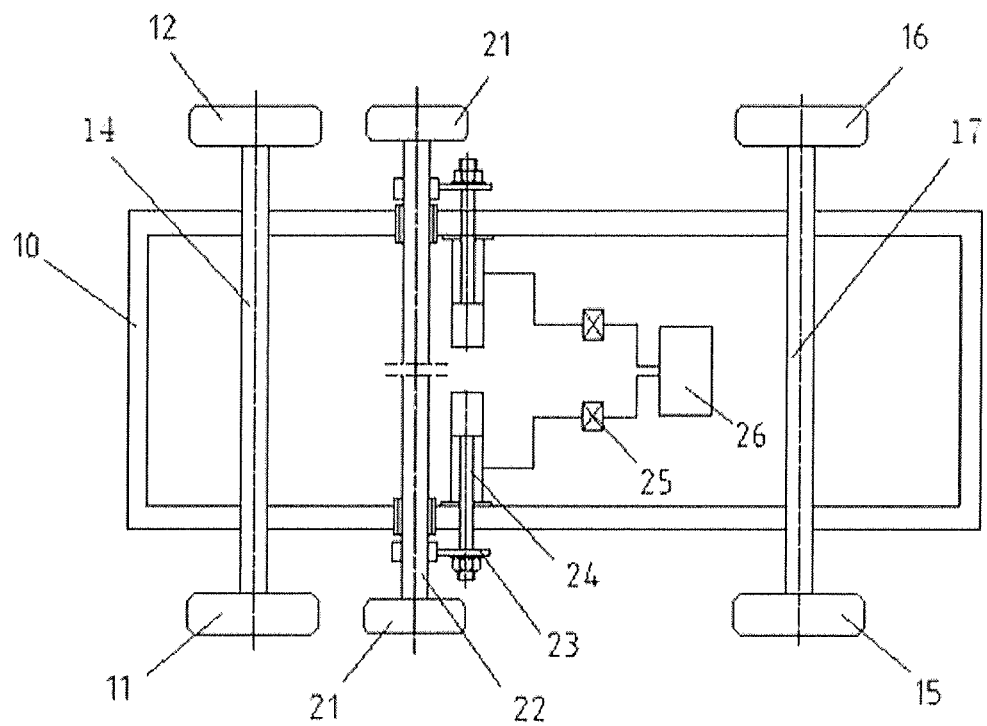

See FIG. 1, the present invention also provides a contains implementation example 1 in the multi-function vehicle rollover judgment system of automatic side flip device, device including multi-purpose vehicle rollover judgment system and the executing agency, described in the actuators are connected to the ECU 6 described by its control action, described the rollover device includes at least one described actuator, described according to the length of the frame and the approval of the vehicle load Settings described in the number of the actuator, each actuator are described including described in 7 on the vehicle frame, and the symmetrical on the left side of the machine and the right side of the actuator 8, See FIG. 3b, the mentioned left actuating mechanism (see FIG. 1) and the mentioned right actuating mechanism (see FIG. 1) both contain a telescopic shaft 22, and a supporting wheel 21 set outside the telescopic shaft 22. The mentioned telescopic shafts 22 are supported by power units and controlled by the driving units (including carrying out the flexible movements and original state). The mentioned supporting wheels are dangling relative to the vehicle wheels and the ground, and wheel tread is the same as the vehicle wheel tread Specifically, in the implementation, the left executor 7 and the right executor 8 are horizontally set on the mentioned vehicle frame to prevent the around vehicle rollover.

The field technicians can understand, of course, the left executor 7 and the right executor 8 are horizontally set on the mentioned vehicle frame to prevent the back and forth vehicle rollover. Among them, the power component has three available drive ways, air pressure drive, hydraulic drive and mechanical drive.

As shown in FIG. 1, the former left displacement sensor 1 and right displacement sensor 2, back-left displacement sensor and back-right displacement sensor 4, the output of the circuit connected to input end of the ECU 6 respectively, the output end of the ECU 6 connect to the left and right actuators respectively; The output of the ECU 6 above separately by LCD, forecasting warning module 9, system setting circuit connected to the ECU 6; Regulated power supply connect to the various parts of the controller.

The mentioned left actuating mechanism 7 and right actuating mechanism 8 of ECU 6 have symmetrical outgoing circuit.

In particular, as shown in FIG. 2, in this case, see FIG. 2, the mentioned vehicle has four displacement sensors, and divided into two groups, including symmetric group of front-left displacement sensor 1 and front-right displacement sensor 2, and symmetric group of back-left displacement sensor 3 and back-right displacement sensor 4. One group of displacement sensor, i.e. front-left displacement sensor 1 and front-right displacement sensor 2, respectively symmetrically installed in the both sides of the mentioned vehicle frame 10 and between the mentioned front vehicle bridge 14, and perpendicular to front vehicle bridge 14 and vehicle frame 10. The other group of the mentioned displacement sensor, i.e. back-left displacement sensor 3 and back-right displacement sensor 4, respectively symmetrically installed in the both sides of the mentioned vehicle frame 10 and between the mentioned end vehicle bridge 17, and perpendicular to end vehicle bridge 17 and vehicle frame 10. All ends of displacement sensor are respectively fixed on 10 of the lateral frame and the axle, all the outputs of displacement sensor are respectively connected to the ECU 6 input, all 10 of the lateral displacement sensors are used to detect frame between the axle and the vertical displacement, the displacement is equal to the displacement sensor installation side frame 10 side of the axle suspension system corresponding 13 elastic deformation of the elastic element. Through a wire will be transmitted to the deformation of ECU 6, 6 CPU (central processing unit) in the treatment by ECU transformation, to calculate the displacement sensor corresponding to the load of a wheel. ECU 6 through 10 lateral displacement sensor to detect frame and axle vertical displacement between the calculated displacement speed, the speed is the frame of the reverse displacement. Turnover rate of frame can also be obtained through the calculation of migration velocity of vehicle load.

See FIG. 1, ECU 6 respectively received the offset of front-left displacement sensor 1, front-right displacement sensor 2, back-left displacement sensor 3 and back-right displacement sensor 4. ECU 6 CPU carry out for the following three steps of calculations:

Step 1: calculate the vehicles left-front, left-back, right-front and right-back wheel bearing capacity corresponding to installed in the vehicle front axle after 14 and 17 of the left-front displacement sensor 1 and right-front displacement sensor 2, right-front displacement sensor 3 and right-back displacement sensor 4;

Step 2: the combination bearing capacity of left-front and left-back wheels equals to G left, and the combination bearing capacity of right-front and right-back wheels equals to G right;

Step 3: compare the bearing capacity of the left and right wheels, when G left is greater than G right, G right/G left=Y left; When G right is greater than G left, G left/G right=Y right. Here, Y left is the drift rate to the left in the vehicle load, Y right is the drift rate to the right in the vehicle load. The greater drift rate Y right or left is, the smaller the tendency of vehicle rollover is, otherwise, the greater the tendency of vehicle rollover is.

When the drift rate of Y left or Y right value reaches the first given peak (partial load value), the ECU 6 by the time delay and sent partial load alarm to alarm module. Applied the above method to calculate, i.e. (front-left wheel load+front-right wheel load)/(back-left wheel load+back-right wheel load), and calculate front or back drift rate of the vehicle load, when reach to peak given, send the front or back rollover alarm. And front or back turning speed of the vehicle can also be calculated.

When drift rate Y left or Y right to the second given peak (vehicle rollover set value or critical value), ECU 6 issue vehicle rollover warning to alarm module, at the same time, the output end of the ECU 6 send instruct to prevent the rollover of the side which has the greatest vehicle wheel bearing and a sharp increase, and carry out the actuator movement. Vehicle rollover set value (or critical value), is adjusted according to the frame turnover rate detected by ECU, when the turnover rate of frame greater than vehicle rollover set value (that is, the vehicle load drift rate Y left or right given the second peak value) appropriate increase, decrease conversely. When the deviation rate of Y left or right back to within the scope of TVC, ECU 6 send termination instruction of preventing the rollover, making the device in the servo state.

Further, the mentioned vehicle frame 10 contains respectively the front and back actuators.

As shown in FIGS. 3a and 3b, specifically refer to FIG. 3 b, in this case, the mentioned power components including high pressure storage tank 26, and on the right and left side of the solenoid valve 25 and respective line, the mentioned high-pressure storage tank 26 through the respective pipe combined solenoid valve 25 and their respective transmission components, each mentioned drive elements including air cylinder 24, the mentioned cylinder 24 and piston rod telescopic line interface combine through the pipe to their electromagnetic valve 25 and the high pressure gas storage tank 26. The mentioned air cylinder 24 piston rod's terminal are connected to the telescopic shaft described 22 through the fixed plate 23. Among them, the left and right actuators of ECU 6 output power line are corresponding connected to the power line of left and right of the electromagnetic valve 25.

As shown in FIG. 3b, the initial state, telescopic shaft return roller 21 of 22 is impending and transverse frame, retraction after reset is the same as the other wheel of the wheel track of the vehicle. In this case, the left side of the drive cylinder 24 24 and drive on the right side of the cylinder block respectively transverse vertical fixed to the frame of 10 left medial and right medial, their respective end of the piston rod on the outer edge of the frame 10 through their respective 23 and their telescopic shaft fixed plate fixed connection, 22 respective piston rod to drive their telescopic shaft and scaling. Respective electromagnetic valve 25 power line corresponding to connect ECU 6 output end of the left and right actuators are the output of the power line, controlled by ECU (6) the respective electromagnetic valve 25, 26, in turn, control of high pressure gas storage of left and right drive 24 gas supply pipe opening and closing of the cylinder. The output of the high pressure gas storage 26 line by the respective solenoid valve connection and 25 control piston rod of the respective drive their telescopic shaft 22 scaling.

Figure 4:
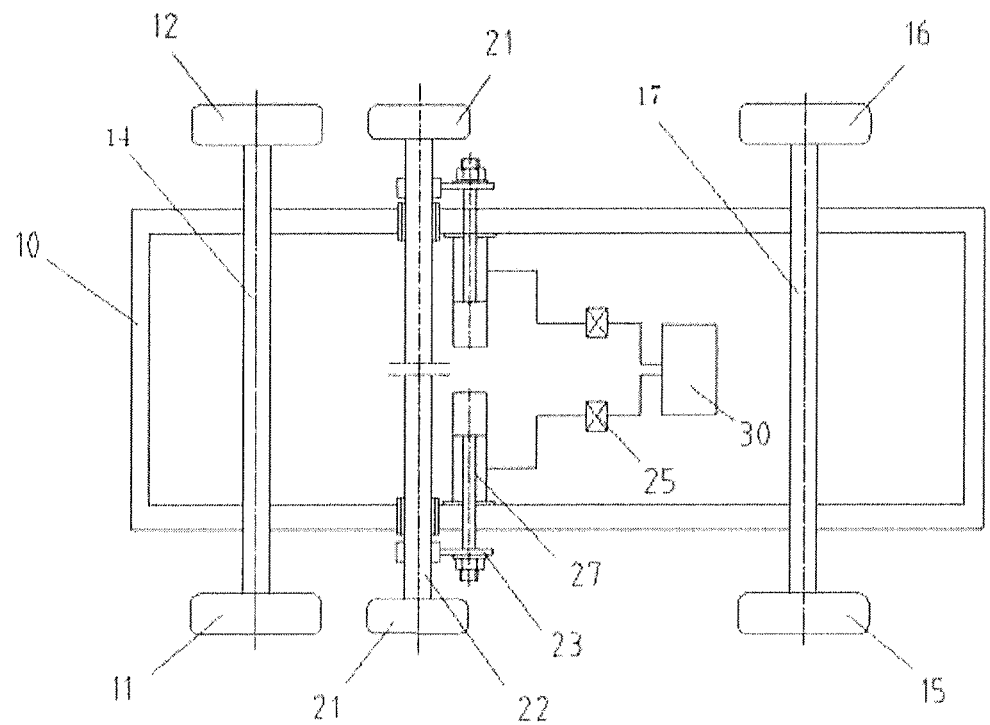
FIG. 4 is the upward view of the mentioned actuating mechanism in the mentioned device of the invention.

As shown in FIG. 4, in this case, power components including hydraulic pump station 30, the left and right of solenoid valve and respective line, described in the hydraulic pump station 30 through the pipe described by their respective electromagnetic valve 25 and described their respective transmission components are linked together, each drive elements are described including the hydraulic cylinder, 27 described in hydraulic cylinder and piston rod telescopic line interface through the pipe described by the respective solenoid valves are connected to the hydraulic pump station 30 stated 25, described in the hydraulic cylinder piston rod 27 terminal through a fixed plate are connected to the telescopic shaft described 22, 23. Among them, the ECU output end of the actuator output power line corresponding connecting the electromagnetic valve of the power line. Hydraulic drive principle with pneumatic drive principle, this case is no longer here.

Figure 5:
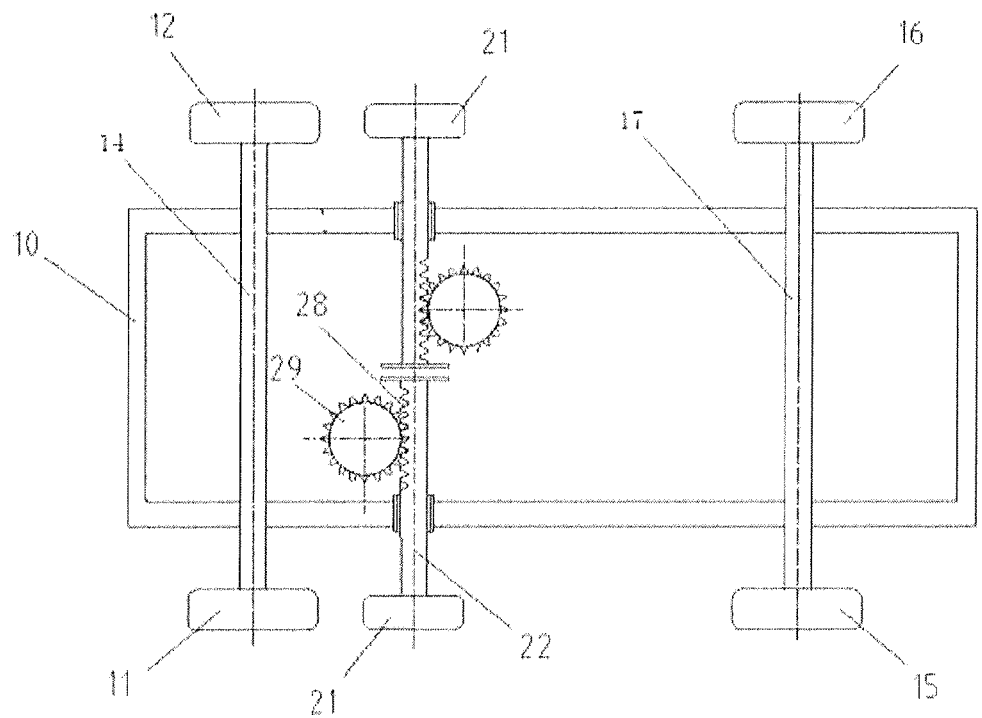
FIG. 5 is the upward view of the mentioned actuating mechanism in the mentioned device of the invention.

As shown in FIG. 5, in this case, power element including the left and the right of the drive motor, described in the respective drive motor are connected to the ECU 6 described respectively, each drive elements are described including meshing gear and rack, 28, 29 described rack 28 set in telescopic shaft on 22, described gear connected to the driven motor is described and 29 through its driver.

As shown in FIG. 5, driving motor driven gear 29 mesh with the rack 28 on the telescopic shaft 22, by the motor forward or reverse drive telescopic shaft 22 telescopic motion. By the output of the ECU 6 of left and right of the actuator power supply and control signal, through wires connected to the left side of the drive motor and corresponding on the right side of the drive motor power supply input.

Figure 6C:
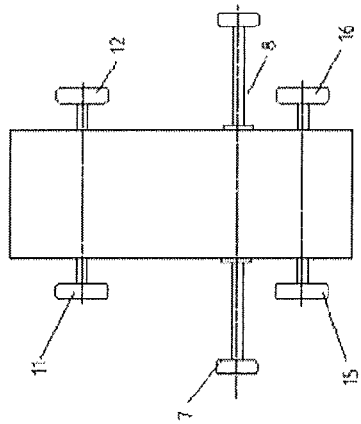
FIG. 6c is the state graph of avoiding the left-direction rollover of the mentioned device.
Figure 6D:
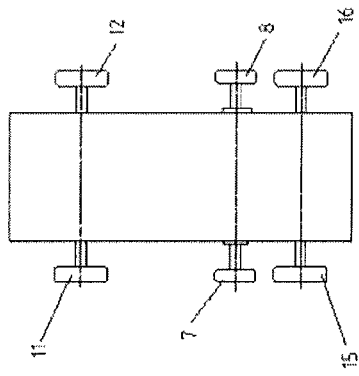
FIG. 6d is the restoration graph of FIG. 6c.
Figure 6A:
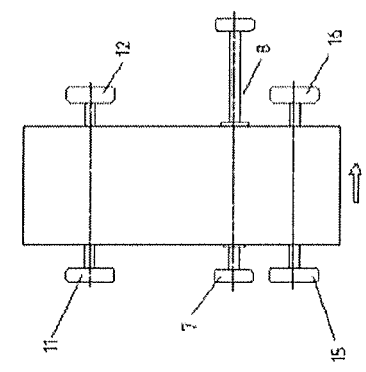
FIG. 6a is the state graph of avoiding the right-direction rollover of the mentioned device.
Figure 7:
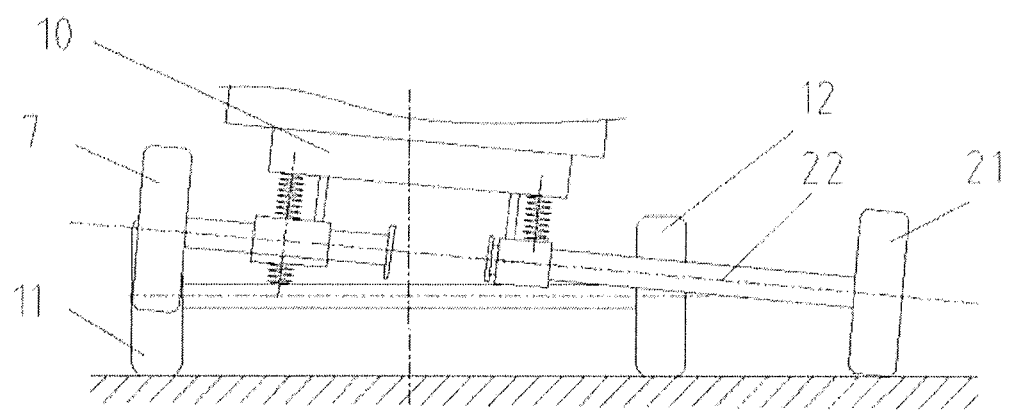
FIG. 7 is the state graph of avoiding the right-direction rollover of the mentioned device.

The vehicles with the present invention implementation, in the process of motionless or running, may have several possibilities of rollover, now we take pneumatic drive for example:

As shown in FIG. 6a, when vehicles carry the drift rate Y left to set the vehicle rollover peak, this device of multifunctional rollover decision system to determine the vehicle to the left, ECU 6 output to the left of the actuator solenoid valve 25 issue open on the left side of the cylinder and piston rod out valve's instructions, the left side of the cylinder piston rod to drive the vehicle on the left side of the scale of 24 22 out quickly to the vehicle on the left side of the shaft, when the telescopic shaft outside the return wheel touches the ground at the 22, 22 telescopic shaft outside the return roller in the left side of the vehicle to create a support, to stop the vehicle on the left side. As shown in FIG. 7, this figure is in vehicle rollover, this device to prevent vehicle rollover schematic diagram, the figure according to the vehicle to the right, for example. The executive body of the apparatus in the vehicle load drift rate Y right set peak reached a cartwheel, 22 in this device on the right side of the telescopic shaft drive out to car body on the right side, driven by rapid telescopic shaft 22 after out the return roller contact with the ground, the telescopic shaft 22 at the right side of the car a support, to prevent the occurrence of vehicle rollover.

Figure 6B:
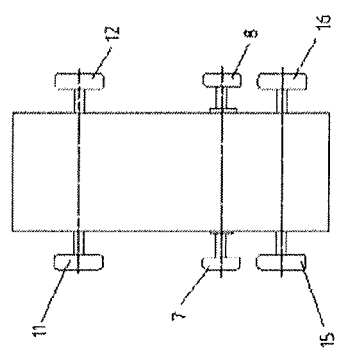

As shown in FIG. 6b, when telescopic shaft 22 generate a support (see FIG. 6a) on the right side of the vehicle, stop the vehicle roll to the left, and the drift rate Y back to the TVC, the output of the ECU 6 sent on the left side of the electromagnetic valve actuator 25 off on the left side of the cylinder and piston rod out valve's instructions, including the open on the left side of the cylinder and piston rod retraction valve's instructions, on the left side of the cylinder 24 piston rod to drive the telescopic shaft 22 back quickly, make this device in the rollover prevention servo state.

As shown in FIG. 6c and FIG. 7, when drift rate Y right reach to vehicle rollover setting value, this device of multi-functional rollover judging system determine the vehicle rolling to the right; ECU 6 output end send signal (opening cylinder 24's piston rod to stretch out air valve) to electromagnetic valve actuator 25 (on the right side), and the right side cylinder 24's piston rod drive the right side telescopic shaft 22 to the right side of vehicle quickly; when the return wheel of outside telescopic shaft 22 touches the ground, the telescopic shaft 22 will give a lateral strut to the right side of the vehicle to stop vehicle rolling to the right side.

As shown in FIG. 6d, when telescopic shaft 22 give a support (see FIG. 6) on the right side of the vehicle, it will stop the vehicle rolling to the right; and when the drift rate Y right recover to the safe value, the output of the ECU 6 send the signal (closing the right side cylinder 24's piston rod to stretch out the valve) to the electromagnetic valve actuator 25, and send another signal (open right side cylinder 24's piston rod to retract valve), and right side cylinder 24's piston rod drive the telescopic shaft 22 retract back quickly to make this device in servo state of anti-rollover.

Figure 6E:
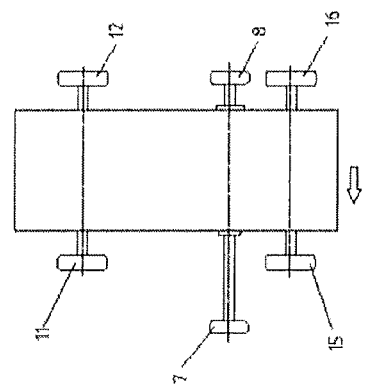
FIG. 6e is the state graph of avoiding the rollover or turnover when the four wheels of the mentioned device.

As shown in FIG. 6e, when the displacement amount of the mentioned front-left displacement sensor 1 and front-right displacement sensor 2, back-left displacement sensor 3 and back-right displacement sensor 4 are equal to zero (i.e. front-left vehicle wheel 11, front-right wheel 12, back-left vehicle wheel 15, back-right wheel 16, the four wheel bearing is zero); in this device of multi-function rollover judging system, ECU 6 determine the vehicle is in a suspended state, and this vehicle to ground is in a state of uncertainty.

In order to prevent vehicle falling into the ground caused to rollover or rolling, the output end of the ECU 6 send the signal (open cylinder 24's piston rod which on the left and the right to stretch out the valve) to electromagnetic valve 25 which on the actuator of left side and right side, and cylinder 24's piston rod on the right side and left side drive the telescopic shaft 22 on the left side and right side stretching out to the left and the right side of the vehicle at the same time; it will help to stop rolling to the right side or left side when the vehicle falling into the ground. When the landing vehicle is in a state of rolling, the stretching out axle from the both side of vehicle also will prevent the vehicle from rolling.

Figure 6F:
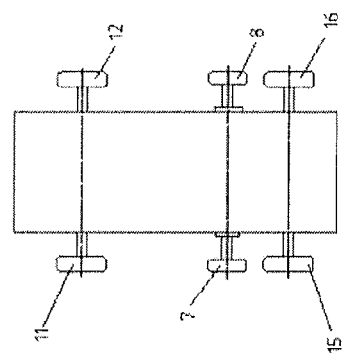
FIG. 6f is the restoration graph of FIG. 6e.

As shown in FIG. 6f, when the vehicle ground left Y or right Y back to the safe range, ECU 6 output send the instruct to the electromagnetic valve 25 of left actuator and right actuator to shut down the left and right air cylinder 24's piston rod out valve, at the same time, to open the left and right air cylinder 24's piston rod turn back the valve, the left and the right side of the cylinder 24's piston rod drives the telescopic shaft 22 retract back quickly to make this device in the servo state of anti-rollover.

The advantages of this invention are as followed:

1. This system adopts displacement sensor and intelligentized ECU which have sensitive reaction and reliable controlling. The device will stretch out the axle to the side of rollover when the rollover accident occurs on vehicle, and the return wheel on the outside of telescopic shaft will give the vehicle a lateral strut to prevent rollover accident from happening.

2. The device will prevent the rollover no matter caused by any factors. Based on the scheme of the device judging whether the rollover accident happen or not: ECU can judge it by the drift rate of left wheel and right wheel's bearing capacity, and finally the rollover will reflect on the shifting of wheel toward the side of rollover no matter caused by any factors, so the device can prevent different kinds of rollover.

3. With no impacting on any other functions, the device is independent of any systems in the vehicle.

4. If the rollover accident happens, the device will stretch out an axle to the rollover side, the return wheel on the outside of telescopic shaft give the vehicle a lateral strut; when the rollover accident is removed, the telescopic shaft will automatically retracting to reset without operating by the driver.

5. The multi-functionality is reflected through the functional extension of ECU; the device can also possess of all the following functions: automatic anti-rollover function, the vehicle's load measuring function, instruction and warning function of the unbalance loading of cargos.

6. The device is easy to install.

Implement Rule 3

Just as the 1A showed that the differences between rule 3 and rule 1 are: the mentioned system includes a steering wheel angle sensor 32 and a VSS 31, which is connected with EU 6 correspondingly. The rule will not give unnecessary details in the rest similarities.

Specifically, the aforementioned 32 detects the rolling angle and velocity of the steering wheel, the aforementioned 31 detects the running speed of the vehicle; the output end of 32 and 31 is connected with the input end of ECU 6 correspondingly.

The multifunctional rollover judgment system detects the car loading offset by displacement sensor between axles, and detects the load capacity by transferring to ECU, so that do balancing adjustment toward cargos manually or start unbalance loading alarm module through ECU.

Implementation 4

Figure 1A:
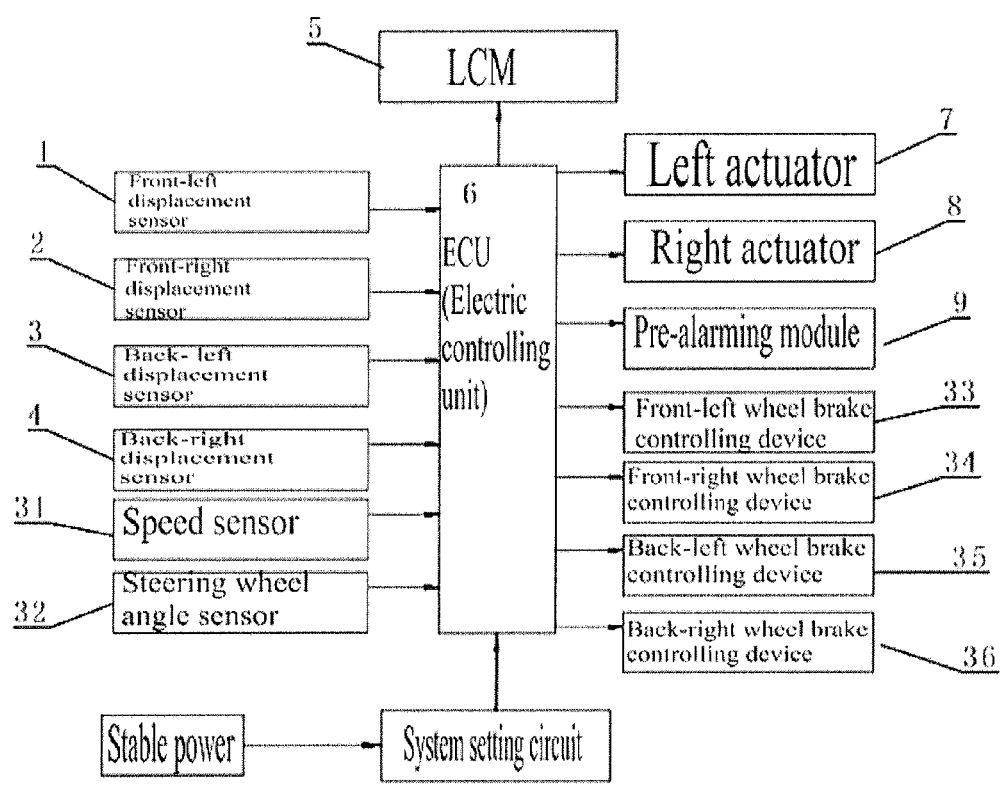
FIG. 1A is the logical control graph of the other mentioned system in the invention.

See FIG. 1A, the rules in the invention also provide another automatic anti-rollover device which includes multifunctional rollover judgment system, the mentioned device includes multifunctional judgment system and actuator (mentioned in rule 3); the actuator is connected with ECU 6 and controlled under it, and the mentioned actuator include front-left wheel brake controlling device 33, front-right wheel brake controlling device 34, back-left wheel controlling device 35 and back-right wheel brake controlling device 36; Implementing brake controlling device toward single wheel is the prior art, and we will not repeat it; the mentioned actuator also include left actuator 7 and right actuator 8 which is symmetrical and set on the frame. Both of the actuator 7 and actuator 8 include a telescopic shaft 22(see FIG. 3b), and the return wheel 21(see FIG. 3b) which is set on the outside of mentioned telescopic shaft 22. The mentioned telescopic shaft 22 (see FIG. 3b) provides power through power element and controls the mentioned telescopic shaft 22 to implement the telescopic motion through driving element; the mentioned telescopic 22 is lateral on frame 10, and the mentioned return wheel 21 (see FIG. 3b) is dangling which is relative to mentioned wheel and ground, and its tread is the same with tread of mentioned vehicle; The front-left wheel brake controlling device 33, front-right wheel brake controlling device 34, back-left wheel controlling device 35 and back-right wheel brake controlling device 36 implement alternate braking toward front-left wheel, back-left wheel or front-right wheel and back-right wheel of the vehicle's outside turning under the control of ECU.

The differences of rule 4 and rule 2 are: the system in rule 4 includes a steering wheel angle sensor 32 and a VSS 31, and the mentioned device of rule 4 includes front-left wheel brake controlling device, front-right wheel brake controlling device, back-left wheel controlling device, back-right wheel brake controlling device. The rule will not give unnecessary details on the rest same structures.

See FIG. 1A, rules in the invention also provide automatic anti-rollover device, which include multifunctional rollover judgment system and its connected actuator. It will detect the loading offset of axle left wheel & right wheel and deflection speed of the frame by displacement sensor 1,2,3,4, and the steering wheel angle sensor 32 and VSS 31 detect the operating state, then judge the rollover by transferring to ECU 6 and start actuator according to the judging result through ECU 6 to prevent the rollover accident from happening. No matter what reasons caused the rollover accident, it will finally reflected on the wheel loading will shift to the side of rollover; the invention is based on this principle, so that this invention has wider application range than existing technology and it also possesses of high accuracy & good anti-rollover quality.

See FIG. 1A, in this rule, ECU receive the displacement of front-left displacement sensor 1 and front-right displacement sensor 2, back-left displacement 3 and back-right displacement sensor 4 correspondingly, the CPU in the ECU 6 can calculated in the following three steps:

Step 1: Calculate the front-left displacement sensor 1 and front-right displacement sensor 2 which set on front axle 14 and back axle 17, and the bearing capacity which is relative to the left-front wheel, left-back wheel, right-front wheel and right-back wheel of left displacement sensor 3 and back-right displacement sensor 4.

Step 2: The left-front wheel's carrying capacity plus left-back carrying capacity is G left, right-front wheel's carrying capacity plus right-back wheel's carrying capacity is G right;

Step 3: Compare the left wheel's carrying capacity with right wheel's carrying capacity, when the G left is greater than G right, G right/G left=Y left; when G right is greater than G left, G left/G right=Y right. Y left is the drift rate of the car loading shift to the left wheel, Y right is the drift rate of car loading to the right wheel. The greater drift rate Y right or left is, the smaller the tendency of vehicle rollover is, otherwise, the greater the tendency of vehicle rollover is. The drift rate of car loading can be directly gained by the displacement of front-left displacement sensor 1, back-left displacement sensor 3, front-right displacement sensor 2 and back-right displacement sensor 4, and it can also get the overturning speed of the frame.

When the drift rate—Y left or Y right's value decreased to the first peak value (rollover setting value), the steering wheel angle sensor 32 and VSS 31 will detect the vehicle is turning at the fixed steering wheel corner and speed, so the decreasing of ECU 6 drift rate—Y left or Y right's value is caused by the centrifugal force, at this time, ECU 6 will send rollover alarm to the module 9, and meanwhile send braking signal to the front-left wheel brake controlling device 33 and back-left wheel brake controlling device 35 or front-right wheel brake controlling device 34 and back-right wheel brake controlling device 36 which at the outside of turning (the side of vehicle maximum loading and remarkable increasing), so do alternate braking to the front-left wheel, back-left wheel, front-right wheel and back-right wheel until the drift rate-Y left or Y right's value recovered to the first peak value (rollover setting value), the above braking stopped and the alarm relieved. When the steering wheel angle sensor 32 and VSS 31 detect the vehicle driving at the fixed speed straightly (or the steering angle sensor lower than the fixed turning), the drift rate—Y left or Y right's value gradually decreased to the first peak value (rollover setting value), so the decreasing of ECU drift rate Y left or Y right' value is caused by the rollover car unbalance loading or road slanting and lateral force, and ECU 6 will send rollover alarming signal to alarming module. When the VSS 31's detecting speed is zero, the drift rate—Y left or Y right's value gradually decreasing, the ECU vehicle will smoothing to another side at the stopping state, when drift rate—Y left or Y right's value gradually decreased to the first peak value (rollover setting value), ECU 6 will send rollover alarming signal to the alarm module.

The mentioned multi-functional rollover judgment system compare the front wheel with back wheel's loading according to the above method, and do judging and alarming toward the front-turning or back-turning.

When the drift rate Y left or Y right's value surpass the first peak value (rollover setting value) and reach to the second peak value (rollover setting value is rollover critical value), ECU 6 will send rollover alarming to the alarming module, the output end of ECU 6 will send anti-rollover signal to the left actuator or right actuator at the side of maximum wheel loading and remarkable speeding, then the left actuator or right actuator will start work. The anti-rollover setting value (rollover critical value) will moderate according to ECU detected rollover speed; when the frame rollover speed is quick, and the rollover setting value (namely loading drift rate Y left or Y right's second peak value) will properly increasing, otherwise decreasing. When the drift rate—Y left or Y right recover to the system set safety range, ECU 6 will send stopping anti-rollover signal to make the device in waiting state.

The advantages of this invention are as followed:

1. The mentioned system adopts displacement sensor, steering wheel angle sensor, VSS and intelligentized electronic controlling unit-ECU, so it has sensitive reaction and reliable controlling; when the rollover accident happens, the actuator has two anti-rollover measures, when the first anti-rollover measure (ECU brakes the outside of turning vehicle) can not prevent the rollover accident from happening, so the second anti-rollover measure (namely, left actuator 7 or right actuator 8) mentioned device stretch axle to rollover side, and the return wheel on the outside of telescopic shaft will give a lateral strut to the vehicle to prevent the rollover accident. When the vehicle meets rollover accident, because of the effect of first anti-rollover measure, it reduced the stretching rate of second anti-rollover measure's stretching axle to the outside of turning vehicle.

2. The device will prevent the rollover caused by any factors. Based on the scheme of the device judging whether the vehicle is rollover or not: ECU can judge it by the drift rate of left wheel and right wheel's bearing capacity, and finally the rollover will reflect on the shifting of the wheel toward the rollover side no matter caused by any factors, so the device can prevent different kinds of rollover.

3. The mentioned actuating mechanism has two measures to prevent the vehicle rollover, i.e. first, to alternately brake the wheels when turning, second, to stretch out telescopic shaft of the left or right actuating mechanism to the rollover direction, or combine with the mentioned multi-function vehicle-rollover judging system into an anti-rollover mechanism.

4. With no impacting on any other functions, the device is independent of any systems in the vehicle.

5. When the mentioned device meets rollover accident, ECU will automatic start anti-rollover actuator to prevent the accident, when the rollover accident is removed, the anti-rollover actuator will automatically retracting to reset without operating by the driver.

6. The multi-functionality is reflected through the functional extension of ECU; the device possess of all the following functions: automatic anti-rollover function, the vehicle's load measuring function, instruction and warning function of the unbalance loading of cargos.

7. The device is easy to install.

The above mentioned is the optimum rules, and it is not used to impose on the invention. Any modification, equal replacement and improvement which are according to the spirit and principle of the invention should be in the invention's scope of protection.

What is claimed is:

1. A multi-functional rollover judgment system, comprising:
   at least two displacement sensors;
   ECU connected with sensors correspondingly;
   and an output device connected with the ECU;
   wherein the displacement sensors are distributed by a group of two, and at least one group displacement sensor set between the frame and axle symmetrically;
   both ends of all the displacement sensors are set on the outside of frame and axle, and all of the displacement sensors' output end are connected with the ECU input end;
   all of displacement sensors used for detecting the vertical displacement between the frame outside and axle, and this displacement is equal to the amount of elastic deformation of elastic component on the side of suspension system which is relative to the frame installed on the displacement sensor;
   through this wire, it can make the deflection transferred to the ECU and calculate the wheel's bearing capacity relative to displacement sensor through the CPU processing conversion in the ECU;
   there are four displacement sensors in two groups which include symmetrically set front-left displacement sensor & front-right displacement sensor, and symmetrically set back-left displacement sensor and back-right displacement sensor;
   the CPU of the ECU can be calculated in the following three steps:
   Step 1: Calculate the front-left displacement sensor and front-right displacement sensor which set on front axle and back axle, and the bearing capacity which is relative to the front-left wheel, left-back wheel, right-front wheel and right-back wheel of left displacement sensor and back-right displacement sensor;
   Step 2: The left-front wheel's carrying capacity plus left-back carrying capacity is G left, right-front wheel's carrying capacity plus right-back wheel's carrying capacity is G right;
   Step 3: Compare the left wheel's carrying capacity with right wheel's carrying capacity; when the G left is greater than G right, G right/G left=Y left; when G right is greater than G left, G left/G right=Y right, Y left is the drift rate of the car loading shift to the left wheel, Y right is the drift rate of car loading to the right wheel, the drift rate of car loading can be directly gained by the displacement of front-left displacement sensor, back-left displacement sensor, front-right displacement sensor and back-right displacement sensor; the ECU will calculate the displacement speed through the displacement sensor detecting the vertical displacement set between the flame outside and axle, and the displacement velocity is the overturning speed of frame, the overturning speed can be gained through calculating the shift speed of car loading;
   When the drift rate Y left or Y right's value reach to the peak value rollover setting value, the ECU will send rollover alarming signal to the alarming module;
   When the drift rate Y left or Y right's value reach to the second peak value rollover setting value is rollover critical value, and the ECU send rollover alarming to the alarming module, the output end of the ECU will send anti-rollover signal to the wheel at the side of maximum wheel loading and remarkable increasing, then start work;
   When the drift rate—Y left or Y right recover to the system set safety range, the ECU will send stopping anti-rollover signal to make the device in waiting state.

2. The multi-function vehicle-rollover judging system as stated in claim 1, wherein the output device contains a display module and pre-alarm module, and the system is also including an input module, which is connected to the ECU.

3. The multi-function vehicle-rollover judging system as stated in claim 1, wherein the system is also connected to an actuating mechanism which is used for avoid the rollover of the vehicle.

4. The multi-function vehicle-rollover judging system as stated in claim 1, wherein the system includes a steering wheel and VSS which are all connected with ECU correspondingly.

5. An automatic anti-rollover device of multi-functional rollover judgment system in claim 4, wherein the device include multifunctional rollover judgment system and actuator, and the actuator is connected with the ECU and controlled under it; the mentioned actuator include front-left wheel brake controlling device, front-right wheel brake controlling device, back-left wheel controlling device and back-right wheel brake controlling device; the mentioned actuator also include left actuator and right actuator which is symmetrically set on the frame; both of the left actuator and right actuator include a telescopic shaft, and the return wheel which is set on the outside of mentioned telescopic shaft, the mentioned telescopic shaft provides power through power element and control the mentioned telescopic shaft to implement the telescopic motion through driving element; the mentioned return wheel is dangling toward mentioned wheel and ground, and its tread is the same with tread of mentioned vehicle; the front-left wheel brake controlling device, front-right wheel brake controlling device, back-left wheel controlling device and back-right wheel brake controlling device implement alternate braking toward front-left wheel, back-left wheel or front-right wheel and back-right wheel of the vehicle's outside turning under the control of the ECU.

6. An automatic anti-rollover device which includes the multi-functional rollover judgment system mentioned in claim 1, wherein the device includes the multi-functional rollover judgment system and actuator which is connected with the ECU under its control; the mentioned actuator at least include left actuator and right actuator symmetrically on the frame and the above mentioned left actuator and right actuator all include a telescopic shaft and the return wheel on the outside of shaft; the mentioned shaft all provide power through power element, and control the mentioned telescopic shaft to implement the telescopic motion through driving element; the mentioned return wheel is dangling toward the mentioned wheel and ground, and its tread is the same with tread of mentioned vehicle.

7. The automatic anti-rollover device of claim 6, wherein the actuator is set on the front side and back side of frame in the vehicle.

8. The automatic anti-rollover device of claim 6, wherein the power element include high-pressure gasholder, solenoid valve and pipeline; the mentioned high-pressure gasholder is connected with the driving element through the mentioned solenoid valve in the pipeline, and the mentioned solenoid valve is also connected with the ECU; the driving element includes air cylinder which is connected with high-pressure gasholder through solenoid valve in the pipeline, and the mentioned cylinder is connected with telescopic shaft through fixed plate.

9. The automatic anti-rollover device of claim 6, wherein the power element include hydraulic power pack, solenoid valve and pipeline; the mentioned hydraulic power pack is connected with the driving element through solenoid valve in the pipeline, and the mentioned solenoid valve is connected with the ECU; the mentioned driving element include hydraulic cylinder which is connected with the hydraulic power pack through solenoid valve in the pipeline, the mentioned is still connected with mentioned telescopic shaft through fixed plate.

10. The automatic anti-rollover device of claim 6, wherein the power element includes driving motor which is connected with the ECU; the mentioned driving element include mesh gear and rack, the mentioned rack setting is set on the telescopic shaft and the mentioned gear is connected with the mentioned driving motor and drove by it.

* * * * *